Jan. 7, 1969 H. SCHWARTZ 3,421,007

PHOTOELECTRIC AMPLIFIER CIRCUIT WITH COMPENSATION
FOR GRADUAL ILLUMINATION CHANGES

Filed March 24, 1965

INVENTOR
HERMANN Schwartz
BY Werner W. Kleeman
His Attorney

United States Patent Office 3,421,007
Patented Jan. 7, 1969

3,421,007

PHOTOELECTRIC AMPLIFIER CIRCUIT WITH COMPENSATION FOR GRADUAL ILLUMINATION CHANGES

Hermann Schwartz, Adliswil, Switzerland, assignor to Siegfried Peyer, Baech, Switzerland, a citizen of Switzerland Filed May 24, 1965, Ser. No. 458,199
Claims priority, application Switzerland, May 28, 1964, 6,964/64
U.S. Cl. 250—214 9 Claims
Int. Cl. H01j *39/12;* G01n *21/30;* H03f *1/30*

ABSTRACT OF THE DISCLOSURE

A photoelectric transistorized amplifier circuit is disclosed particularly for use in an electronic yarn cleaner. The inventive amplifier circuit is characterized by the features that for the purpose of compensating for gradual or noninstantaneous changes in the illumination conditions at the photoelectric transducer, a variable impedance is arranged in the signal current circuit of the amplifier circuit wherein the impedance can be changed with a certain time delay in response to the operating conditions prevailing at a control or regulating circuit which, in turn, response to deviations in the magnitude of the signal voltage in the signal current circuit from a reference value.

Figures 1, 2:
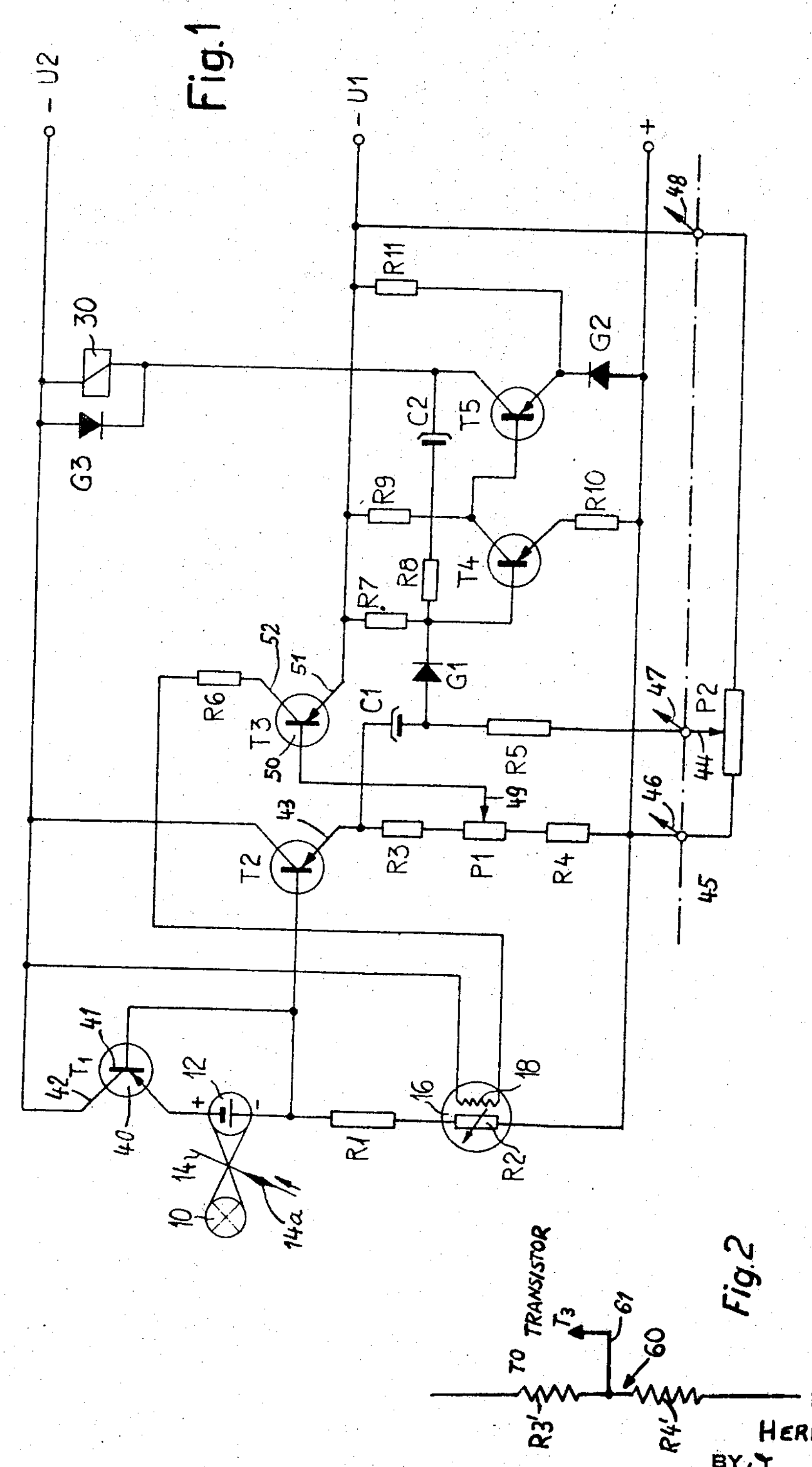

The present invention has reference to an improved photo electric amplifier circuit particularly suitable for application with an electronic yarn cleaner and is of the type which generates an electric signal as a function of the impingement of light upon a photoelectric transducer.

With certain uses of photoelectric transducers it is of paramount importance that the electric output signal is in fixed nonvariable relationship to spontaneous variations of the light impingement occurring for short periods of time, yet is independent of gradual changes of the illumination conditions. Such is particularly the case of electronic or electro-optical yarn cleaners serving to determine changes in cross-section of a through-passing yarn or thread. As known, in such case it is not possible to be content with an approximate determination of any type of yarn defects. Rather, it is essential that the yarn cleaner responds to deviations in cross-section of the yarn which exceed a given, generally adjustable value. This is only obtainable with exact correlation of the electric signal to the yard cross-section and to the impingement of light upon the photoelectric transducer. The once preset "cleaning action" must thus remain constant with time and, moreover, must be the same for a larger number of such yarn cleaners arranged next to one another at a winding machine for instance. However, it is exactly at the mentioned yarn cleaners that it is impossible to prevent gradual changes of the illumination conditions, whether such are because of deposition of dust or the like upon the optical components, aging of the lamp or fluctuations of its supply voltage.

Accordingly, it is a primary object of the present invention to provide an improved amplifier circuit for a photoelectric transducer wherein the mentioned conditions are fulfilled and difficulties of the type described do not occur.

A further more specific object of the present invention concerns itself with an improved photoelectric amplifier circuit employing means for compensating for gradual changes in the illuminating conditions, so that it is still possible to reliably detect faults in the yarn which are desired to be removed.

Generally speaking, in order to achieve these and still further objects of the invention the inventive amplifier circuit is generally characterized by the features that for the purpose of compensating for gradual or non-instantaneous changes in the illumination conditions at the photoelectric transducer a variable impedance is arranged in the signal current circuit of the amplifier circuit wherein the impedance can be changed with a certain time delay in response to the operating conditions prevailing at a control or regulating circuit which in turn responds to deviations in the magnitude of the signal voltage in the signal current circuit from a reference value.

Other features, objects and advantages of the invention will become apparent by reference to the following detailed description and drawing wherein:

FIGURE 1 schematically depicts the circuit diagram for a preferred embodiment of inventive amplifier circuit employed with an electro-optical yarn cleaner; and FIGURE 2 illustrates details of a portion of the circuit of FIGURE 1 employing a voltage divider in place of the potentiometer.

Describing now the illustrated embodiment, and referring initially to FIGURE 1 it will be recognized that the yarn cleaner arrangement contains a photoelement 12, preferably a silicon photoelement, and providing the photoelectric transducer. The photoelement or transducer 12 is illuminated by a lamp 10 supplied in suitable manner with constant voltage. In so doing, the impingement of light upon the photoelement 12 is dependent upon the cross-section of a through-passing yarn or thread 14, at which there is schematically depicted in the drawing an instantaneous cross-section thickening at 14*a* which represents a yarn defect which is to be detected or picked up by the cleaner.

Considering the phototransducer or photoelement 12 more closely, it will be seen that such is coupled with the emitter 40 of a common-base connected transistor T1. Resistors R1 and R2 are coupled in the emitter-collector circuit 40, 42 of transistor T1. The signal voltage appears across the resistors R1 and R2 in the form of a variable voltage drop during fluctuation of the photoelectric current. The resistor R2 forms part of an externally heated negative temperature coefficient (NTC) resistance arrangement 16 incorporating the heating coil 18 and thus provides a variable impedance.

In order that only small load acts upon the relatively high-ohmic emitter point of transistor T1 there is coupled therewith a common-emitter connected transistor T2. The amplified signal voltage appears at the emitter circuit of the transistor T2 across series connected resistors R3, R4 and the potentiometer P1. The emitter 43 of transistor T2 is electrically coupled via a capacitor C1 and diode G1 to a signal amplifier embodying both of the transistors T4, T5, the resistors R7 to R11, the capacitor C2 and the diode G2. An operable member, e.g., a relay or magnet 30 with a diode G3 connected in parallel is located at the output of the transistor T5 and serves to actuate a non-illustrated cutting device for the yarn and/or an indicating or counting mechanism.

The diode G1 is connected through the agency of a resistor R5 with the tap 44 of a potentiometer P2. A preselected bias can be set at the potentiometer P2 which ensures that only signal voltages arrive at the subsequent amplifiers T4, T5 which exceed a predetermined value and serve to excite the winding or operable member, i.e., relay or magnet 30. Thus, adjustment of the potentiometer P2 serves to fix the cleaning action or the degree of cleaning of the yarn cleaner. As schematically indicated by the chain dot line 45 and the branch arrows 46, 47 and 48, the potentiometer P2 can be commonly associated with a plurality of cleaners, each of which are to be regulated to the same cleaning efficiency or degree. The tap 49 of the potentiometer P1 located in the emitter circuit of transistor T2 is coupled with the base 50 of a transistor T3. Emitter 51 of transistor T3 is supplied with a constant direct-current voltage —U1. The collector circuit for transistor T3 includes the collector 52 and the heating coil or winding 18 of the NTC-resistor arrangement 16 in series connection with a resistor R6.

The power supply for the illustrated amplifier circuit occurs via the terminals "+," "—U1" (e.g., —10 volts) and "—U2" (e.g., —27 volts). Naturally, the lamp 10 can be connected to the same supply unit, for instance between the terminals "+" and "—U1."

During operation of the described system the phototransducer or photoelement 12 delivers a current directly determined by the impingement of light from the lamp 10 and provides the emitter current for the transistor T1. It will be appreciated that in the base circuit the collector current is the same as the emitter current. Consequently, current amplification by transistor T1 amounts to the factor 1, for which reason variations in the characteristics of the individual transistors are without influence and also ageing cannot displace the operating point. Hence, there is provided a highly stable amplifier which is of considerable importance for the requirements mentioned at the outset for yarn cleaners.

When a yarn defect, schematically indicated at **14*a*, passes through the photoelectric arrangement 10, 12, for instance the considered thickening of the yarn cross-section, then a corresponding instantaneous drop in light appears at the photoelement 12. This results in reduction of the photoelectric current and the emitter current and thus a change in voltage, the value of which (magnitude of the signal voltage) is dependent upon the sum of the resistances R1+R2. A corresponding signal also appears at the emitter 43 of transistor T2 and across the series connection of resistor R3, potentiometer P1 and resistor R4. This signal arrives for further amplification at the transistor T4 in the event that the bias adjusted at the potentiometer P2 permits, that is, in the event there appears such a faulty condition at the yarn 14** which should cause response of the cleaner.

A certain potential for the base 50 of transistor T3 is tapped-off at the potentiometer P1 which is slightly more negative than the potential —U1 at the emitter 51 Control or regulating transistor T3 controls the current for the heating coil 18 of the NTC-resistor arrangement 16 coupled in its collector circuit 52 whereby, in turn, there is determined the resistance value of the NTC-resistor R2. In this manner due to the position of the tap 48 at the potentiometer P1 the reference value of the resistance sums R1+R2 is regulated and, thus, also the magnitude of the signal voltage. The steady state condition corresponds to a predetermined voltage drop across the series connected resistors R3, R4 and potentiometer P1, of which a certain component thereof is tapped-off at potentiometer P1.

Now, if a gradual noninstantaneous change of the illumination conditions appears at the photoelement 12 (for instance due to ageing of the lamp 10, appearance of dust, etc.), then compensation or regulation takes place via the control transistor T3 which again provides the original steady state conditions. For instance, with a gradual drop in light due to dust deposition or ageing of the lamp 10 the photoelectric current becomes smaller and thus also the emitter current of transistor T1. The voltage across the resistors R1+R2 and thus also at the emitter 43 of transistor T2 drops, and the corresponding displacement of the potential at the base 50 of transistor T3 with respect to the reference voltage —U1 at the emitter 51 affects reduction of the collector current of transistor T3. Since the heating coil 18 now receives less power the resistance of the NTC-resistor becomes larger until the original voltage drop across resistors R1+R2 is again regulated with the reduced emitter current of transistor T1. In so doing, there is automatically again obtained the same signal magnitude for yarn defects. For instance, with suitable dimensioning and at a light loss of 80% the voltage drop and the magnitude of the signal is compensated to within approximately 1%, this regulating precision is completely sufficient for practical requirements. In so doing, it is of course essential that compensation takes place with a certain time delay (generally in the order of magnitude of 15 seconds) due to the thermal time constant of the NTC-resistor arrangement 16, and thus the compensation is only effective during corresponding slow changes of the photoelectric current, whereas instantaneous changes—as such are caused by yarn defects—do not have any effect upon the NTC-resistor R2.

Thus there is provided a regulating or compensating circuit where transistor T3 serves as the compensating or regulating amplifier, the voltage —U1 as the reference voltage, potentiometer P1 as the means for regulating the reference value, the base 50 of transistor T3 as feeler, and NTC-resistor arrangement 16 as thermally delayed adjustment means or element.

Due to the described regulation or control it is possible to also use photoelements possessing characteristics which deviate from one another without such having an influence upon the magnitude of the signal. Thus, it is possible to operate without calibrating the yarn cleaner. Previously, it was necessary to undertake careful balancing of the individual cleaners and amplifiers by means of specially designed checking or testing apparatus in order that there was ensured uniform sensititvity (cleaning action) of cleaners working next to one another at the same winder and with the same yarn.

Since, as mentioned, different amplifications by the transistors does not have any influence upon the magnitude of the signal and different current sensitivities of the photoelements are compensated by the regulating or compensating circuit previously considered, as shown in FIGURE 2 it is also possible to dispense with the potentiometer P1 as reference value adjustment means and to provide in lieu thereof a fixed voltage divider 60 which taps-off at 61 a nonvariable component of the signal voltage. For this purpose if two resistors R3' and R4' tolerated to 1% are employed then without further balancing it is possible to achieve an exactness of the magnitude of the signal of ±2% which is quite sufficient for most applications.

While there is shown and described a present preferred embodiment of the invention it is to be distinctly understood that the invention is not limited thereto but may be oherwise variously embodied and practised within the scope of the following claims.

What is claimed is:

1. A photoelectric transistorized amplifier circuit for use in an electronic yarn cleaner, said circuit generating an electrical signal as a function of the impingement of light upon photoelectric transducer, said circuit comprising: a signal current circuit including a common-base connected transistor means, photoelectric transducer means coupled in the emitter current circuit of said common-base connected transistor means, and an adjustable impedance means coupled in the emitter-collector circuit of said common-base connected transistor means; control circuit means for regulating the value of said adjustable impedance means, said adjustable impedance means responding after a time-delay, said control circuit means including a control transistor means, means coupling the base of said control transistor means with said signal current circuit, means coupling the emitter of said control transistor means with a reference voltage, and means coupling the collector of said control transistor means to said adjustable impedance means, said control transistor means responding to deviations of the voltage in said signal current circuit from a reference value.

2. Photoelectric amplifier circuit as defined in claim 1 wherein said adjustable impedance means incorporates an externally heated heating coil.

3. Photoelectric amplifier circuit as defined in claim 1 wherein said means coupling said base of said control transistor means permits adjustment of a perdetermined reference voltage component.

4. Photoelectric amplifier circuit as defined in claim 1 wherein said means coupling said base of said control transistor means is defined by a potentiometer disposed in said signal current circuit.

5. Photoelectric amplifier circuit as defined in claim 1 wherein said means coupling said base of said control transistor means comprises fixed voltage divider means disposed in said signal current circuit.

6. Photoelectric amplifier circuit as defined in claim 1 further including signal amplifier means coupled with said signal current circuit for actuating an operable member.

7. Photoelectric amplifier circuit as defined in claim 6 including means for selectively controlling signals delivered to said signal amplifier means.

8. Photoelectric amplifier circuit as defined in claim 1 wherein said variable impedance means incorporates a negative temperature coefficient resistance arrangement.

9. Photoelectric amplifier circuit as defined in claim 1, further including a lamp means adapted to be connected to a source of supply, said lamp means being disposed in proximity to said photoelectric transducer means.

References Cited

UNITED STATES PATENTS

| | | | |
|---|---|---|---|
| 2,084,135 | 6/1937 | Ford | 330—143 |
| 3,005,915 | 10/1961 | White et al. | 250—214 |
| 3,309,754 | 3/1967 | Metcalf | 250—219 X |

WALTER STOLWEIN, *Primary Examiner.*

U.S. Cl. X.R.

250—219; 330—143